US008376723B2

United States Patent
Kugelev et al.

(10) Patent No.: US 8,376,723 B2
(45) Date of Patent: Feb. 19, 2013

(54) CONNECTING ROD WITHOUT WRIST PIN

(75) Inventors: Vladimir Kugelev, Arlington, TX (US); Mark D. Matzner, Burleson, TX (US)

(73) Assignee: Weir SPM, Inc., Fort Worth, TX (US)

( * ) Notice: Subject to any disclaimer, the term of this patent is extended or adjusted under 35 U.S.C. 154(b) by 369 days.

(21) Appl. No.: 12/683,804

(22) Filed: Jan. 7, 2010

(65) Prior Publication Data

US 2010/0172778 A1    Jul. 8, 2010

Related U.S. Application Data

(60) Provisional application No. 61/143,300, filed on Jan. 8, 2009.

(51) Int. Cl.
*F04B 53/10* (2006.01)
(52) U.S. Cl. ............... 417/568; 92/188; 92/139; 92/140
(58) Field of Classification Search .............. 417/568, 417/273; 92/140, 139, 188; 123/197.2–197.4; 74/579 E
See application file for complete search history.

(56) References Cited

U.S. PATENT DOCUMENTS

| | | | | |
|---|---|---|---|---|
| 4,842,039 A | * | 6/1989 | Kelm | 164/312 |
| 5,115,725 A | * | 5/1992 | Horiuchi | 92/157 |
| 5,247,873 A | * | 9/1993 | Owens et al. | 92/157 |
| 5,560,332 A | * | 10/1996 | Chang | 123/197.3 |
| 7,588,384 B2 | * | 9/2009 | Yokohara | 403/135 |
| 7,610,847 B2 | * | 11/2009 | McKelroy | 92/140 |
| 2008/0006148 A1 | | 1/2008 | McKelroy | |

* cited by examiner

*Primary Examiner* — Devon Kramer
*Assistant Examiner* — Ryan Gatzemeyer
(74) *Attorney, Agent, or Firm* — Bracewell & Giuliani LLP

(57) ABSTRACT

A reciprocating pump assembly has a pump within a housing. The pump has a crankshaft that rotates and a crosshead that is connected to a plunger via a pony rod. The plunger pumps fluid through cylinders in the pump. A connecting rod connects at one end to the crankshaft and at another end to the crosshead to translate the crankshaft's rotational movement into linear movement of the crosshead and thereby the plunger. The end connected to the crosshead is secured to the crosshead by a bushing located within the crosshead that allows the connecting rod end to pivot during operation. The bushing extends more than 180 degrees, retaining the connecting rod with the crosshead without the need for a wrist pin. The end secured by the bushing can be retained within the bushing by a lock plate, and retainers without the need for a wrist pin.

10 Claims, 4 Drawing Sheets

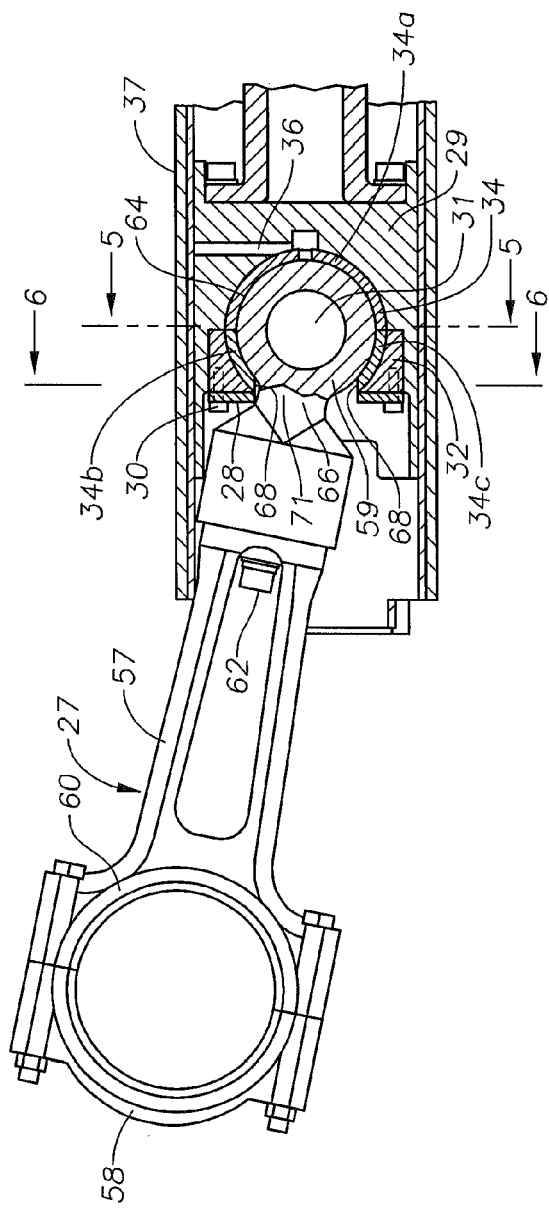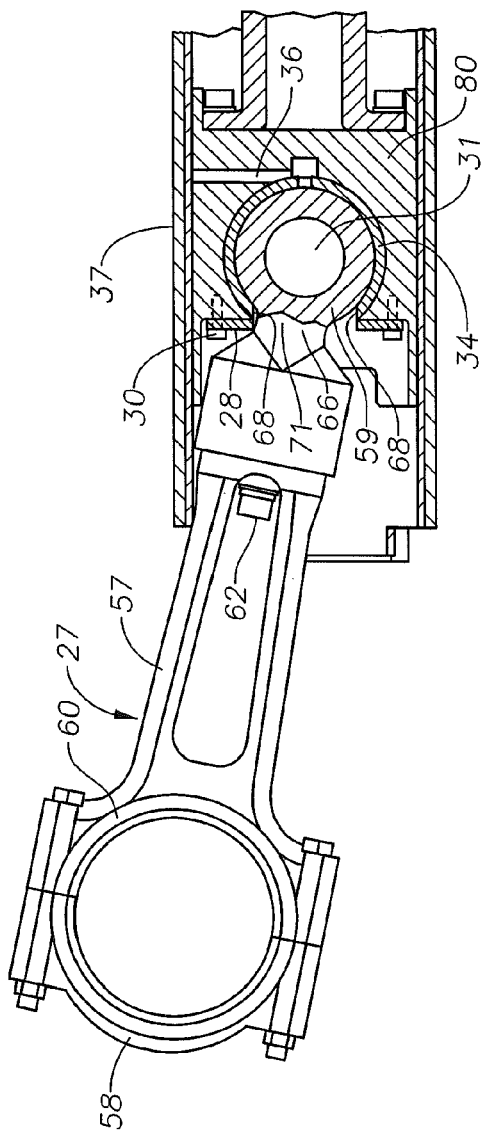

CONNECTING ROD WITHOUT WRIST PIN

CROSS-REFERENCE TO RELATED APPLICATION

This application claims priority to provisional application No. 61/143,300 filed Jan. 8, 2009.

FIELD OF THE INVENTION

This invention relates in general to connecting rods used in reciprocating pump crankshafts, and, in particular, to a connecting rod that does not require a wrist pin to link it to the crosshead.

BACKGROUND OF THE INVENTION

Connecting rods are used in various kinds of pumps used in oilfield operations. A connecting rod can be used, for example, in a reciprocating pump. The reciprocating pump can be used to pump fluid such as chemicals, cement, or other media into a well. Reciprocating pumps typically increase the pressure within a cylinder by reciprocating a plunger longitudinally within the cylinder. The connecting rod typically has a body and two ends. The crosshead end has a hole that allows the end to be connected to a crosshead, which is connected to a pony rod, which in turn is connected to the plunger. The other end secures to a crankshaft that rotates.

The crosshead reciprocates within a crosshead housing and has a concave cavity that receives the crankshaft end of the connecting rod. To secure the end of the connecting rod to the crosshead, a wrist pin is inserted through the hole formed in the crosshead end of the connecting rod. The wrist pin thus pivotally secures the end of the connecting rod to the crosshead and allows for the translation of the crankshaft's rotational movement into linear movement of the crosshead and thereby the plunger. The wrist pin is an additional part that may need to be replaced during the life of the pump. Further, the wrist pin adds weight to the overall pump weight, which can make the transportation of reciprocating pumps more difficult and expensive. Also, disconnecting the connecting rod from the crosshead requires driving the wrist pin out.

Thus, it would be desirable to provide a connecting rod for use in reciprocating pumps that does not require a wrist pin to secure an end of the connecting rod to a crosshead.

SUMMARY OF THE INVENTION

In an embodiment of the present invention, a reciprocating pump assembly has a pump located inside a housing. The pump has a crankshaft that rotates and a crosshead that is connected to a plunger via a pony rod. The plunger pumps fluid through cylinders in the pump when it is moved longitudinally within the cylinder. A connecting rod has a body and connects at one endpiece to the crankshaft and at another endpiece to the crosshead to thereby translate the crankshaft's rotational movement into linear movement of the crosshead and thereby energize the plunger.

In this embodiment, the endpiece connected to the crosshead is secured to the crosshead by a bushing located within the crosshead. The bushing extends more than 180 degrees around the connecting rod's endpiece. The crosshead bushing allows the connecting rod's endpiece to pivot within the bushing during pump operation. To retain the connecting rod's endpiece within the bushing, a lock plate, support blocks, and retainers may be used. This eliminates the need for a wrist pin, resulting in one less part to service and repair. Further, the body and the endpiece of the connecting rod may be fabricated with hollow portions to lighten the weight of the connecting rod and thereby the weight of the pump assembly.

BRIEF DESCRIPTION OF THE DRAWINGS

FIG. 3 an enlarged sectional view of one embodiment of the connecting rod without a wrist pin, and is constructed in accordance with the invention;

FIG. 4 an enlarged sectional view of one embodiment of the connecting rod without a wrist pin, and is constructed in accordance with the invention.

DETAILED DESCRIPTION OF THE INVENTION

Figure 1:
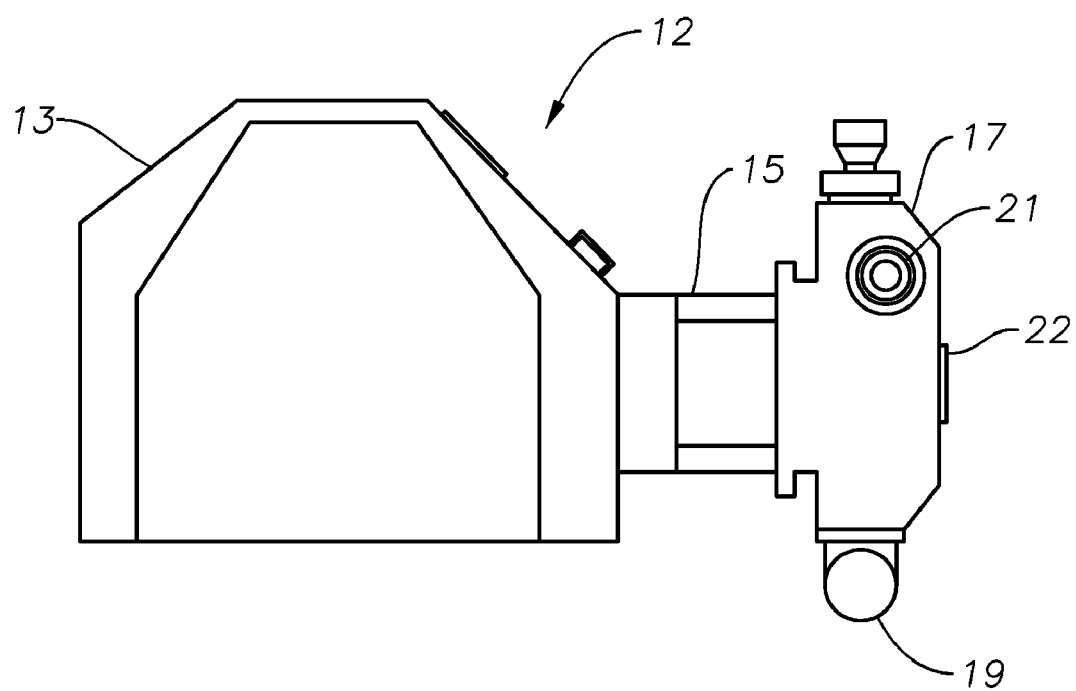
FIG. 1 is an illustration of a reciprocating pump constructed in accordance with the invention.
Figure 2:
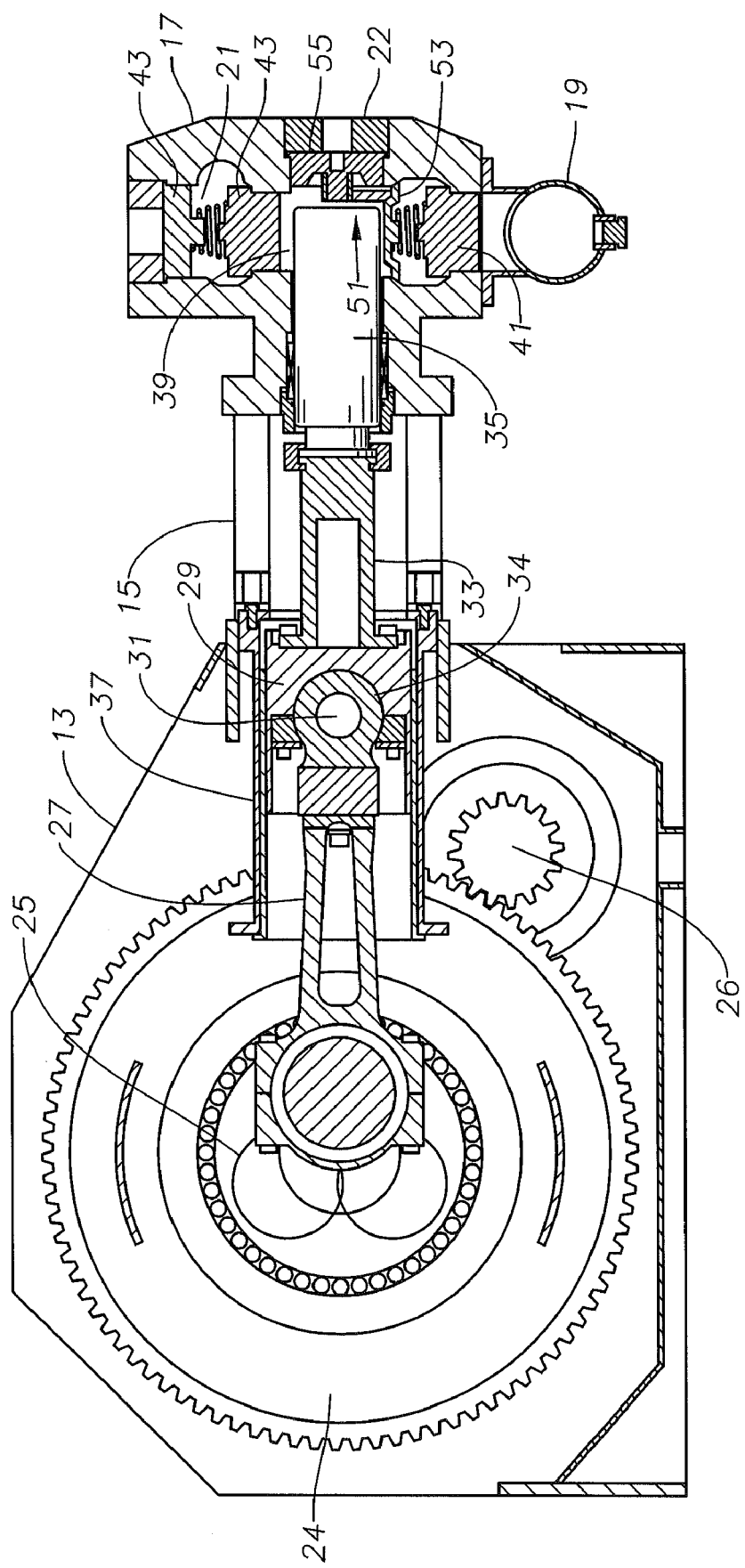
FIG. 2 is a schematic illustration of the connecting rod location within the reciprocating pump crankshaft housing, and is constructed in accordance with the invention.

Referring to FIGS. 1 and 2, reciprocating pump assembly or pump 12 includes a crankshaft housing 13 that comprises a majority of the outer surface of reciprocating pump 12. Stay rods 15 connect crankshaft housing 13 to a set of cylinders 17. Each cylinder 17 is in communication with a fluid inlet 19 and a fluid outlet 21. As shown in FIGS. 1 and 2, a suction cover plate 22 connects to an end of each cylinder 17 opposite the plunger rod housing 15. Pump 12 can be free-standing on the ground, can be mounted to a trailer that can be towed between operational sites, or mounted to a skid such as for offshore operations.

Referring to FIG. 2, a portion of reciprocating pump 12 housed within crankshaft housing 13 is shown. Crankshaft housing 13 houses a crankshaft 25, which is typically mechanically connected to a motor (not shown). The motor rotates crankshaft 25 in order to drive reciprocating pump 12 (FIG. 1). In one embodiment, crankshaft 25 is cammed so that fluid is pumped from each cylinder 17 at alternating times. As is readily appreciable by those skilled in the art, alternating the cycles of pumping fluid from each of cylinders 17 helps minimize the primary, secondary, and tertiary (et al.) forces associated with reciprocating pump 12 (FIG. 1).

Figure 5:
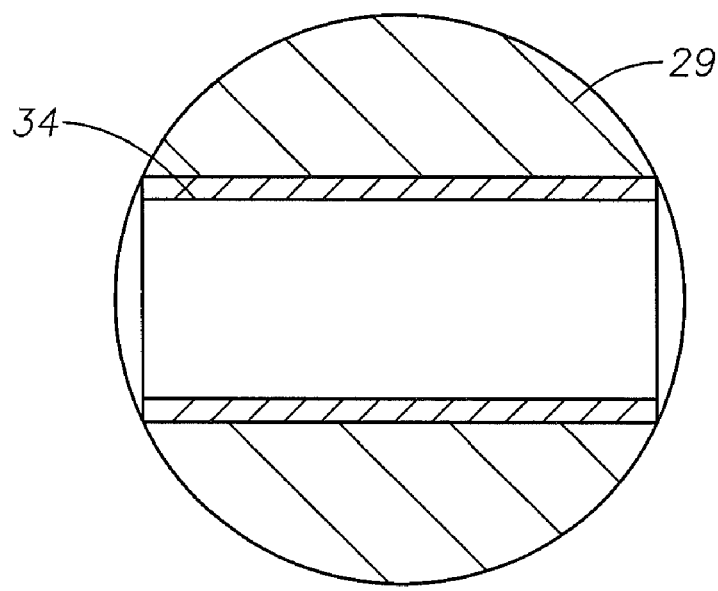
FIG. 5 is a sectional view of the crosshead of FIG. 3, taken along the line 5-5 of FIG. 3, but with the crosshead housing and the connector rod not shown.
Figure 6:
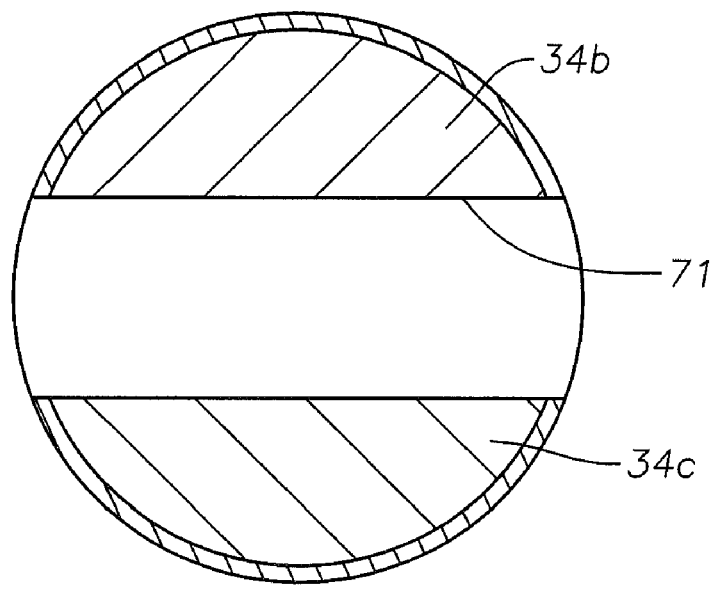
FIG. 6 is a sectional view of the crosshead of FIG. 3, taken along the line 6-6 of FIG. 3, but with the crosshead housing and the connector rod not shown.

A gear 24 is mechanically connected to crankshaft 25 and is rotated by the motor through gears 26 and 24. A connecting rod 27 is shown as a substantially solid piece and shown connected to the crankshaft 25 at one end by an endpiece. The connecting rod 27 is pivotally secured by a bushing 34 within the crosshead 29, which holds connecting rod 27 longitudinally relative to crosshead 29. Crosshead 29 reciprocates within a crosshead housing 37. Crosshead 29 may have flat and parallel sides. Alternatively, the crosshead 29 may be cylindrical, as shown in FIGS. 5 and 6. The connecting rod 27 pivots within the crosshead bushing 34 as crankshaft 25 rotates with the other end of connecting rod 27. A pony rod 33 extends from crosshead 29 in a longitudinally opposite direction from crankshaft 25. Connecting rod 27 and crosshead 29 convert rotational movement of crankshaft 25 into longitudinal movement of pony rod 33.

A plunger 35 is connected to pony rod 33, which may be considered an extended portion of plunger 35, for pumping the fluid passing through cylinder 17. Cylinder 17 includes an interior or cylinder chamber 39, which is where plunger 35 pressurizes the fluid being pumped by reciprocating pump 12 (FIG. 1). Cylinder 17 also typically includes an inlet valve 41 and an outlet valve 43. Valves 41 and 43 are usually spring-loaded valves and are actuated by a predetermined differential pressure. Inlet valve 41 actuates to control fluid flow through fluid inlet 19 into cylinder chamber 39, and outlet valve 43 actuates to control fluid flow through fluid outlet 21 from cylinder chamber 39.

Plunger 35 reciprocates, or moves longitudinally toward and away from cylinder 17, as crankshaft 25 rotates. As plunger 35 moves longitudinally away from cylinder chamber 39, the pressure of the fluid inside chamber 39 decreases, creating a differential pressure across inlet valve 41, which actuates valve 41 and allows the fluid to enter cylinder chamber 39 from fluid inlet 19. The fluid being pumped enters cylinder chamber 39 as plunger 35 continues to move longitudinally away from cylinder 17 until the pressure difference between the fluid inside chamber 39 and the fluid in fluid inlet 19 is small enough for inlet valve 41 to actuate to its closed position. As plunger 35 begins to move longitudinally towards cylinder 17, the pressure on the fluid inside of cylinder chamber 39 begins to increase. Fluid pressure inside cylinder chamber 39 continues to increase as plunger 35 approaches cylinder 17 until the differential pressure across outlet valve 43 is large enough to actuate valve 43 and allow the fluid to exit cylinder 17 through fluid outlet 21. In one embodiment, fluid is only pumped across one side of plunger 35, therefore reciprocating pump 12 is a single-acting reciprocating pump.

Referring to FIG. 3, an embodiment of the connecting rod 27 is shown. The connecting rod 27 comprises a body 57 made of steel, or other suitable metallic material, that attaches to the crankshaft 25 (FIG. 2) on one end via an endpiece. An outermost semicircular retainer 58 is placed over the crankshaft 25 and fastened by bolts to the innermost semicircular portion of the endpiece 60, which is integral with the body 57. The body 57 optionally may have a hollow interior that extends approximately the length of the body 57. Alternatively, material may be removed from both sides along the body 57 to leave a thin web of material within the body 57.

The front end of the connecting rod 27 is a steel cylindrical endpiece 59 with an optional hole 31 to lighten the weight of the rod 27. Alternatively, material may be removed from both sides of the steel endpiece 59 to leave a thin wall of material within the endpiece 59. Endpiece 59 may be integrally formed with connecting rod 27 or attached by bolts 62. Endpiece 59 has a cylindrical exterior surface 64 pivotally secured within a concave bushing 34 in the crosshead 29. Cylindrical exterior surface 64 slides relative to bushing 34 as connecting rod 27 pivots up and down. A neck 66 of reduced diameter is located by the cylindrical portion of endpiece 59 and the portion that joins connecting rod 57.

Bushing 34 may comprise a single curved piece of metal that extends circumferentially greater than 180 degrees and less than 360 degrees. Alternately, bushing 34 may comprise three separate pieces 34a, 34b and 34c, as will be described subsequently. The circumferential ends 68 of bushing 34 are spaced apart from each other, defining a gap 71, shown also in FIG. 6. In FIG. 3, gap 71 extends about 70 degrees from one circumferential end 68 to the other and faces the crankshaft 25 (FIG. 2). In the example of FIG. 3, crosshead 29 has one portion that contains about 180 degrees of the partially cylindrical receptacle for bushing 34. Upper and lower retainer blocks 32 attach to this portion and form a part of crosshead 29. Each retainer block 32 continues the partially cylindrical receptacle for bushing 34 for another 55 degrees or so. Bushing portion 34a extends 180 degrees, and bushing portions 34b and 34c extend 55 degrees each in this example. Upper and lower lock plates 28 are located on the sides of retainer blocks 32 opposite crosshead 29. Bolts 30 extend through holes in lock plates 28 and retainer blocks 32 into crosshead 29. Because gap 71 is smaller than the cylindrical portion of endpiece 59, connecting rod 27 is retained within the bushing 34 by lock plate 28, support blocks 32, and bolts 30. The bushing 34 extends more than 180 degrees around the endpiece 59 of the connecting rod 27, so the bushing 34 has enough contact surface to secure the endpiece 59 when the rod is retracted. Gap 71 may extend completely across the width of crosshead 29, thus resulting in a rectangular configuration for gap 71, as shown in FIG. 6. Alternately, lock plates 28 could have semi-circular holes that fit around neck 66, giving gap 71 a circular configuration.

Connecting rod endpiece 59 can be installed and removed from bushing 34 without removing crosshead 29 from crosshead housing 37. To remove it from the position in FIG. 3, the operator releases the bolts fastening lock plates 28 and retainer blocks 34, then removes lock plates 28 and retainer blocks 34. If bushing 34 is in three separate pieces 34a, 34b and 34c, this removal leaves only the 180 degree portion 34a of bushing 34. The operator can simply pull endpiece 59 to the left as shown in the drawing to detach it from crosshead 29.

A lubrication port 36 communicates the periphery of the crosshead 29 to the interior of the crosshead 29 to provide lubricant between the pivoting endpiece 59 and the bushing 34. This arrangement between the bushing 34 and the endpiece 59 of the connecting rod 27 translates the rotational movement of the crankshaft 25 into longitudinal movement of the plunger 35. The connecting rod 27 that does not require a wrist pin and thus is unlike connecting rods in the prior art that are secured to the crosshead 29 via a wrist pin.

In another embodiment (not shown), the lubrication port 36 is located on the endpiece 59 of the connecting rod 27.

In another embodiment shown in FIG. 4, the connecting rod 27 is retained within the bushing 34 by lock plate 28, and bolts 30. The support blocks 32 used in FIG. 3 are omitted in this embodiment. Instead, crosshead 80 contains the full extent of bushing 34, rather than just 180 degrees as in FIG. 3. Connecting rod endpiece 59 is installed in bushing 34 from one side while crosshead 80 is removed from crosshead housing 37. Endpiece 59 would be inserted into bushing 34 in a direction along an axis of bushing 34.

Reciprocating pumps 12 are large, and complex pieces of equipment with many parts that may have to be replaced as they wear out. Minimizing the number of parts by eliminating the need for a wrist pin to connect the endpiece 59 of the connecting rod 27 to the cross head 29 is thus desirable because it makes pump 12 more reliable and simpler. By using a bushing 34 that extends more than 180 degrees around the cylindrical endpiece 59 of the connecting rod 27, the need for a wrist pin is eliminated. The optional hole 31 at the endpiece 59 further provides a lighter weight for the connecting rod 27.

This written description uses examples to disclose the invention, including the best mode, and also enable a person of ordinary skill in the art to practice the invention, including making and using any devices or systems and performing any incorporated methods. These embodiments are not intended to limit the scope of the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A reciprocating pump assembly, comprising:
   a pump housing that houses a crankshaft;
   a plunger for pumping a fluid through a cylinder, the cylinder having fluid ports for ingress and egress of the fluid;
   a crosshead operatively engaged with the plunger at one end, the crosshead having a width from one side to another;
   a partially cylindrical receptacle located within the crosshead at an end opposite the plunger, the receptacle extending across the entire width of the crosshead and having circumferential ends defining a gap that extends across the entire width of the crosshead, the gap having a circumferential extent that is less than 180 degrees;
   a partially cylindrical main bushing segment in the receptacle extending across the entire width of the crosshead, and extending circumferentially no more than 180 degrees;
   a partially cylindrical upper bushing segment extending across the entire width of the crosshead, having a circumferential upper end in abutment with a circumferential upper end of the main bushing segment and a circumferential lower end at an upper edge of the gap;
   a partially cylindrical lower bushing segment extending across the entire width of the crosshead, having a circumferential lower end in abutment with a circumferential lower end of the main bushing segment and a circumferential upper end at a lower edge of the gap; and
   a connecting rod having a crankshaft endpiece and a crosshead endpiece, the crankshaft endpiece rotatably connected to the crankshaft, the crosshead endpiece being in pivotal engagement with the main, upper and lower bushing segments in the receptacle of the crosshead.

2. The reciprocating pump assembly of claim 1, further comprising:
   upper and lower retainer blocks fastened to and extending across the entire width of the crosshead, the upper block having a lower edge defining an upper edge of the gap, the lower block having an upper edge defining a lower edge of the gap.

3. The reciprocating pump assembly of claim 2, wherein the main bushing segment is located in the crosshead, the upper bushing segment in the upper retainer block and the lower bushing segment in the lower retainer block.

4. The reciprocating pump assembly of claim 3, further comprising:
   an upper lock plate fastened to the upper retainer block and having a lower edge at the upper edge of the gap that is abutted by the circumferential lower end of the upper bushing segment; and
   a lower lock plate fastened to the lower retainer block and having an upper edge at the lower edge of the gap that is abutted by the circumferential upper end of the lower bushing segment.

5. The reciprocating pump assembly of claim 1, further comprising a lubrication port located on the crosshead that communicates the periphery of the crosshead with the interior of the crosshead to provide lubricant between the crosshead endpiece and the main, upper and lower bushing segments.

6. A reciprocating pump assembly, comprising:
   a pump housing that houses a crankshaft;
   a plunger for pumping a fluid through a cylinder, the cylinder having fluid ports for ingress and egress of the fluid;
   a crosshead operatively engaged with the plunger at one end;
   upper and lower retainer blocks secured to a face of the crosshead that faces away from the pump housing, the upper and lower retainer blocks extending an entire width of the crosshead;
   a partially cylindrical receptacle having a partially cylindrical main portion located within the crosshead that extends across the entire width of the crosshead and circumferentially no more than 180 degrees, a partially cylindrical upper portion that extends across the entire width of the crosshead, that extends circumferentially less than 180 degrees and is located in the upper retainer block, and a partially cylindrical lower portion that extends across the entire width of the crosshead, that extends circumferentially less than 180 degrees and is located in the lower retainer block, the portions of the receptacle within the retainer blocks having circumferential ends, defining a gap between the circumferential ends that extends across the entire width of the crosshead, that extends circumferentially less than 180 degrees and faces toward the crankshaft;
   a partially cylindrical main bushing segment located in the main portion of the receptacle;
   a partially cylindrical upper bushing segment located in the upper retainer block, the upper bushing segment having a circumferential upper end in abutment with a circumferential upper end of the main bushing segment, the upper bushing segment having a circumferential lower end positioned at an upper edge of the gap;
   a partially cylindrical lower bushing segment located in the lower retainer block, the lower bushing segment having a circumferential lower end in abutment with a circumferential lower end of the main bushing segment, the lower bushing segment having circumferential upper end positioned at a lower edge of the gap; and
   a connecting rod having a crankshaft endpiece rotatably connected to the crankshaft, the connecting rod having a portion extending through the gap between the upper and lower retainer blocks and a crosshead endpiece in pivotal engagement with the main, upper and lower bushing segments in the receptacle of the crosshead.

7. The reciprocating pump assembly of claim 6, further comprising an upper lock plate fastened to the upper retainer block and a lower lock plate fastened to the lower retainer block, wherein the upper lock plate is abutted by the circumferential lower end of the upper bushing segment and the lower lock plate is abutted by the circumferential upper end of the lower bushing segment.

8. The reciprocating pump assembly of claim 6 further comprising a lubrication port located on the crosshead that communicates the periphery of the crosshead with the interior of the crosshead to provide lubricant between the crosshead endpiece and the main, upper and lower bushing segments.

9. A connecting rod assembly, comprising:
   a connecting rod;
   a single-piece crosshead adapted to operatively engage with a plunger at one end;
   a partially cylindrical receptacle located entirely within the crosshead at an end opposite the plunger, the receptacle extending across the entire width of the crosshead, extending circumferentially greater than 180 degrees and having circumferential ends, defining a gap that extends across the entire width of the crosshead, less than 180 degrees and faces toward a crankshaft;

a single-piece bushing located within, extending across the entire width of the crosshead and extending a same circumferential extent as the receptacle;

the connecting rod having a crankshaft endpiece adapted to be rotatably connected to the crankshaft;

the connecting rod having a portion that extends through the gap; and the connecting rod having a crosshead endpiece in pivotal engagement with the bushing in the receptacle of the crosshead.

10. The connecting rod assembly of claim 9, further comprising upper and lower lock plates releasably fastened to a crankshaft-facing side of the crosshead above and below the gap, respectively, the bushing having a circumferential upper end in abutment with the upper lock plate and a circumferential lower end in abutment with the lower lock plate.

* * * * *